(No Model.)
M. E. JEHU.
APPARATUS FOR COOKING, BROILING, BAKING, &c.
No. 514,079. Patented Feb. 6, 1894.
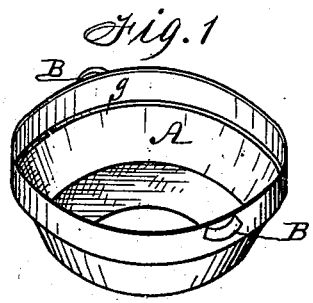
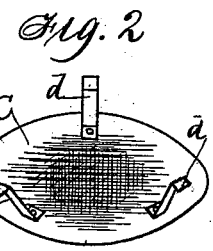
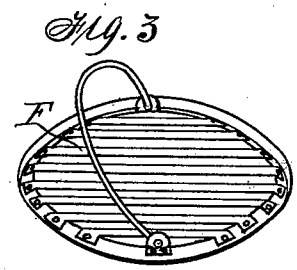
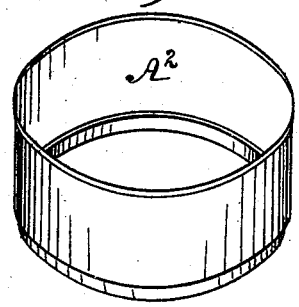
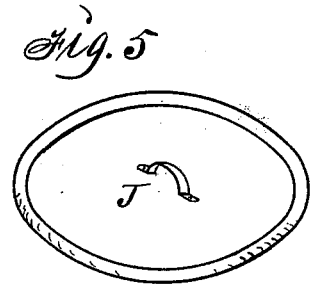
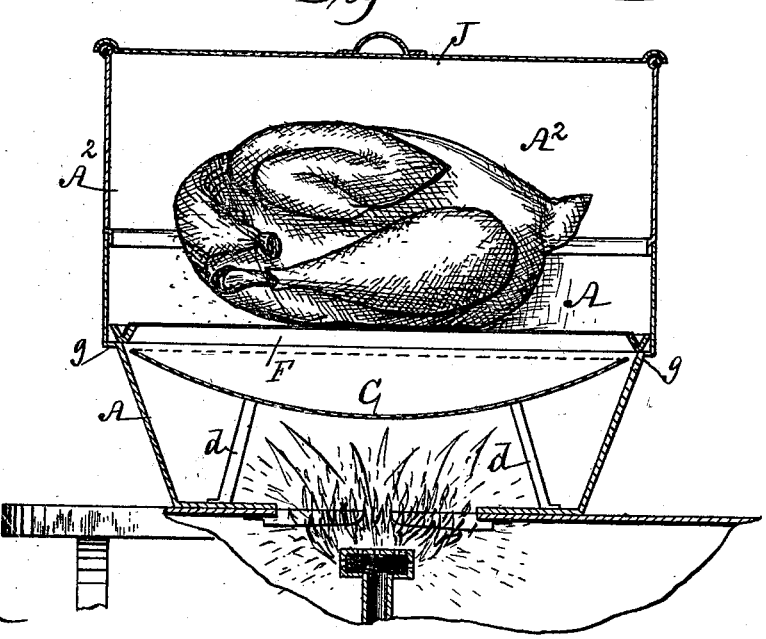

UNITED STATES PATENT OFFICE.

MARGARET E. JEHU, OF ESTHERVILLE, IOWA.

APPARATUS FOR COOKING, BROILING, BAKING, &c.

SPECIFICATION forming part of Letters Patent No. 514,079, dated February 6, 1894.

Application filed May 2, 1893. Serial No. 472,806. (No model.)

*To all whom it may concern:*

Be it known that I, MARGARET E. JEHU, a citizen of the United States of America, residing at Estherville, in the county of Emmett and State of Iowa, have invented an Apparatus for Cooking, Broiling, Baking, &c., of which the following is a specification.

My object is to economize heat and facilitate the labor of cooking, toasting, baking, broiling, roasting, heating water and heating irons by means of liquid and gaseous fuel.

My invention consists in the construction, arrangement and combination with a vapor burning stove, of a hot air chamber, a heat deflector, a griddle, an extension for the hot air chamber, and a cover for the hot air chamber, as hereinafter set forth, pointed out in my claims and illustrated in the accompanying drawings, in which—

Figure 1 is a view of the hot air chamber, Fig. 2 of the deflector, Fig. 3 of the griddle, Fig. 4 of the hot air chamber extension, Fig. 5 of the cover, and Fig. 6 is a sectional view of the apparatus in position, as required for practical use.

A represents the hot air chamber in the form of a sheet metal vessel adapted to be carried about and also adapted to be placed on top of a stove. It has an open top and an opening in the center of its flat bottom to admit the hydro-carbon burner of a vapor-burning stove, as shown in Fig. 6. Hand holds B at its top facilitate lifting it, and its contents, on and off the stove. It may vary in size as desired.

C is a deflector made of sheet metal and adapted in size to be placed in concentric position within the chamber A. It is preferably concavo-convex in form and provided with feet $d$ adapted to rest upon the flat bottom of the chamber A, so that the deflector will be supported immediately over the blaze originating from the burning gas or vapor, as indicated in Fig. 6, to spread and deflect the heat and protect the upper portion of the chamber and everything placed therein from becoming smoked or begrimed from any of the products of combustion. This deflector may be a flat plate or a flat top may be fixed on the top of the concavo-convex plate, as indicated by dotted lines in Fig. 6, to produce an air-tight drum or radiator; but the concave bottom is preferred because it will, in broiling meats, catch and retain drippings of fat.

F represents a broiler adapted in shape and size to be placed upon an annular bead or ledge $g$ on the inside and upper portion of the chamber A.

$A^2$ represents an air chamber extension having an open-bottom and open top and adapted to be detachably placed on top of the open-topped chamber A, to serve, in combination with the chamber A, as an oven for baking and roasting food therein.

J is a cover adapted in shape and size to be placed on top of the chamber A, or on the extension $A^2$ as required to retain the heat.

It is obvious that in the practical operation of my invention composed of the separable parts described, it can be readily handled as required for use or for cleaning and storing away, or packing and shipping. It also is obvious that the heat generated within the chamber will be confined therein and in close contact with the food, or anything that may be placed therein to be subjected to heat. It is also obvious that for toasting bread or broiling meats, &c., the extension $A^2$ is not required, so that the cover J can be placed directly on the top of the chamber A and the heat retained close to the matter placed upon the griddle F, and the heat thus economized and the work facilitated by the removal of the open-bottomed extension chamber $A^2$.

I am aware ovens adapted for use on vapor-burning stoves have been in use, but in no instance has an apparatus been composed of separable parts, as contemplated by my invention, in which an open-topped and open-bottomed extension of the hot air chamber can be advantageously removed in the manner set forth to facilitate cooking and baking and economizing heat.

I claim as my invention—

1. In an apparatus for cooking and broiling food on a vapor burning stove the combination of the following named separable parts, to wit:—a hot air chamber having an opening in its bottom to admit a burner and an open top, a cover for the open top, a deflector having feet adapted to rest upon the bottom of the chamber, and a griddle adapted to be placed upon a support on the inside of the wall of the chamber, arranged and combined to operate in the manner set forth for the purposes stated.

2. An apparatus for cooking, &c., comprising separable parts as follows—: a hot air chamber having an open top and an opening in its bottom, a deflector and means for supporting it within the said chamber and over the opening in its bottom, a broiler and means for supporting it within the said chamber above the said deflector, an extension or auxiliary hot air chamber having an open top and open bottom fitted on top of the main hot air chamber, and a cover for the top of the hot air chamber, arranged and combined with a vapor burner as and for the purposes stated.

MARGARET E. JEHU.

Witnesses:
H. H. DAVIDSON,
S. M. DAVIDSON.